Nov. 20, 1962  G. H. RAWCLIFFE  3,065,395
ROTARY ELECTRIC MACHINES
Filed May 17, 1961  2 Sheets-Sheet 2

INVENTOR
Gordon Hindle Rawcliffe
BY
Stevens, Davis, Miller & Mosher
ATTORNEY

United States Patent Office 3,065,395
Patented Nov. 20, 1962

3,065,395
ROTARY ELECTRIC MACHINES
Gordon Hindle Rawcliffe, Clifton, Bristol, England, assignor to National Research Development Corporation
Filed May 17, 1961, Ser. No. 110,710
Claims priority, application Great Britain June 8, 1960
6 Claims. (Cl. 318—165)

This invention relates to synchronous A.C. electric machines and particularly to synchronous motors suitable for use as electric traction motors.

Conventional 3-phase synchronous motors can be run as single-phase machines by providing a single phase A.C. supply to any pair of the three 3-phase input terminals.

When the motor is run as a single-phase machine in this manner, the single-phase current can be considered as two 3-phase symmetrical components of opposite sequence, positive and negative. The positive sequence current provides normal synchronous operation. The negative-sequence current flows through the negative-sequence impedance of the machine. This impedance is determined mainly by the resistance and the reactance of the starting and damping winding. This winding is built into the field of the machine which, in a machine of any considerable size, is a rotor winding.

It is normally necessary in a single-phase machine to provide an auxiliary starting winding which is wound on the stator. It is never easy to arrange for a high starting torque in such a machine energised from a single-phase A.C. supply but, for many applications, a high starting torque is unnecessary, and this mode of operation thus finds practical use.

In order to obtain the highest theoretical output and efficiency from such a single-phase machine, it is necessary to reduce the value of the negative-sequence impedance to zero. This is impossible in practice.

The object of the present invention is to provide a synchronous machine for single-phase operation wherein the effect of negative-sequence impedance in the machine is compensated by an auxiliary rotating magnetic field.

Accordingly the present invention provides a synchronous electric motor having a main winding energised from a single-phase A.C. source and a field system comprising a winding energised from a D.C. source, in which the field system also comprises a three-phase winding energised from a three-phase source of double the frequency of said single-phase source, the said three-phase winding being such as to provide a rotating field of double the frequency of said single-phase source and of opposite magnitude to the field produced by the negative-sequence current of said single-phase supply.

Figure 1:
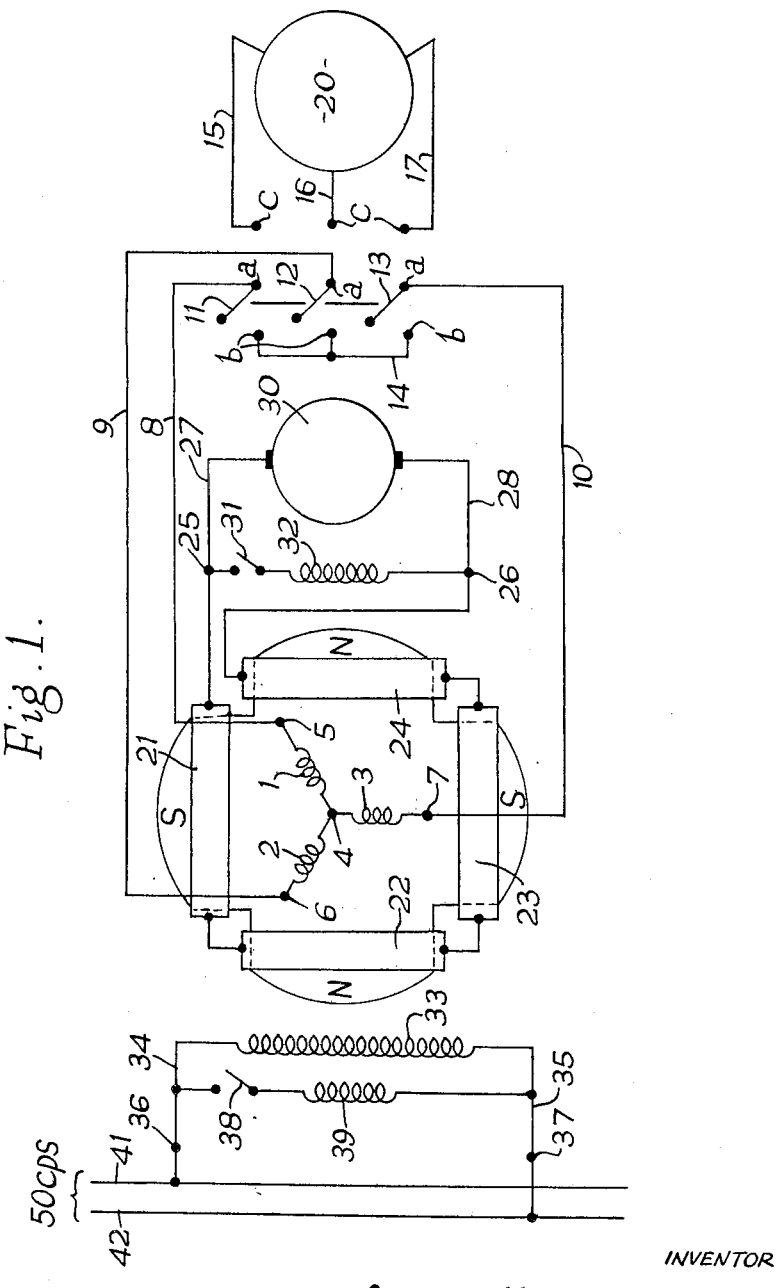
Figure 2:
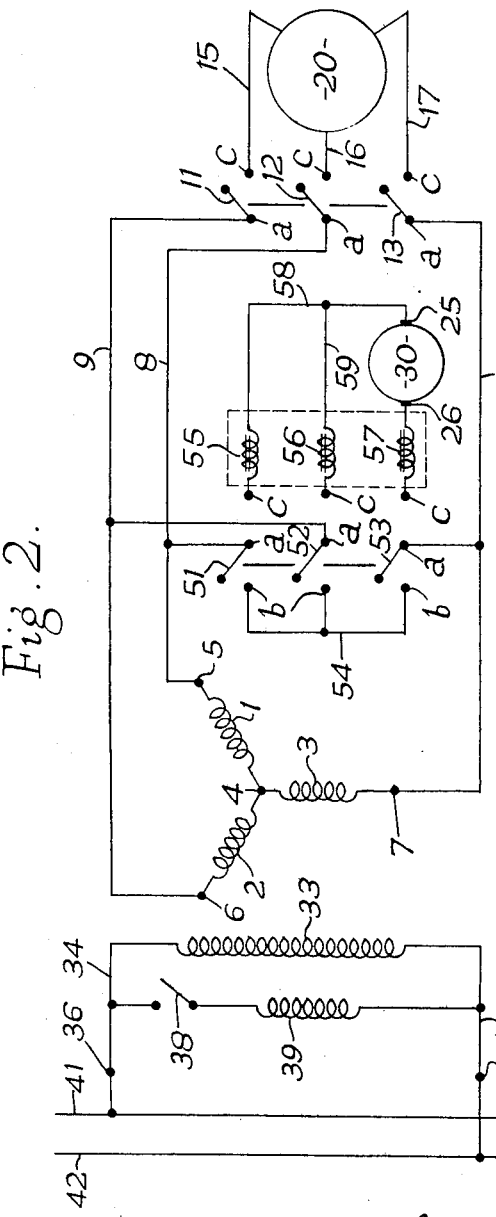

In order that the invention may readily be carried into effect, two practical embodiments will now be described in detail, by way of example, with reference to the accompanying drawings, in which:

FIG. 1 is a circuit diagram of the field windings and auxiliary current supply sources of a 4-pole, single-phase 50 c.p.s. A.C. synchronous induction motor and FIG. 2 is a circuit diagram of the field windings and auxiliary current supply sources of a similar machine of alternative construction, in which a common winding serves for both excitation and for providing the compensating rotating field.

The machine of FIG. 1 is a 4-pole machine of the salient pole type having a main 4-pole winding wound on the rotor of the machine comprising coils 21, 22, 23 and 24 serially connected between terminals 25 and 26. The terminals 25 and 26 are connected by lines 27 and 28 respectively to the output terminals of a D.C. exciter 30 having a common rotor shaft with the 4-pole machine.

Serially connected between lines 27 and 28 are a switch 31 and an exciting winding 32.

The rotor of the 4-pole machine is additionally provided with a 4-pole, 3-phase A.C., pole-face winding comprising three phase-windings 1, 2 and 3 star-connected between the star centre 4 and terminals 5, 6 and 7 respectively. The terminals 5, 6 and 7 are respectively connected by lines 8, 9 and 10 to the moving contacts $a$ of a 3-pole changeover switch 11, 12, 13. When the contacts $a$ and $b$ are closed, the lines 8, 9 and 10 are shorted together through line 14. When the contacts $a$ and $c$ are closed, the lines 8, 9 and 10 are respectively connected by lines 15, 16 and 17 to the output terminals of an 8-pole, 3-phase, 100 c.p.s. A.C. exciter having its rotor fixed to the same shaft as the rotor of the 4-pole, 3-phase A.C. machine and the D.C. exciter 30.

The main armature winding 33 of the 4-pole machine is connected by lines 34 and 35 between terminals 36 and 37. The terminals 36 and 37 are connected to a 50 c.p.s. A.C. supply on lines 41 and 42 respectively.

A starting winding 39 is serially connected with a switch 38 between lines 34 and 35.

To start the 4-pole machine, the 3-pole switch 11, 12, 13 is moved to the position closing contacts $a$ and $b$ to short together terminals 5, 6 and 7. Switch 31 is open to isolate winding 32 and switch 38 is closed to energise starting winding 39.

Switch 31 is later closed, so energising the exciting winding 32 from the exciter 30, to synchronise the 4-pole machine.

After the machine has run up to speed, the 3-pole switch 11, 12, 13 is moved to the position closing contacts $a$ and $c$ to energise the windings 1, 2 and 3 from the 100 c.p.s. A.C. exciter 20.

Switch 38 is opened to isolate the starting winding 39 under running conditions.

The 3-phase, 100 c.p.s. A.C. current from the exciter 20 supplied to the three phase-windings 1, 2 and 3 provides a rotating field. The phasing of lines 15, 16 and 17 is such that the rotating field produced compensates for the negative-sequence current effect due to the single-phase operation of the machine from the supply on lines 41 and 42.

FIG. 2 shows an alternative circuit arrangement for a single-phase synchronous induction motor having a compensating field winding in which the same winding is used for excitation and for providing the rotating compensating field. The main machine of FIG. 2 is a conventional 4-pole synchronous induction motor of the cylindrical rotor type. Corresponding circuit elements to those of FIG. 1 are indicated by the same reference numerals in the two figures. In the example of FIG. 2, the 4-pole, 3-phase A.C. secondary winding of the motor is wound on the rotor of the machine and the main armature primary winding is wound on the stator.

The secondary winding comprises three phase-windings 1, 2 and 3 star-connected between star-centre 4 and terminals 5, 6 and 7 and thence to lines 8, 9 and 10. The lines 8, 9 and 10 are connected, as in the arrangement of FIG. 1, by lines 15, 16 and 17 to the output of an 8-pole, 3-phase, 100 c.p.s. A.C. exciter 20 on the common rotor shaft. In this example, connections between lines 8, 9 and 10 and lines 15, 16 and 17 are made by way of a 3-pole single throw switch 11, 12, 13.

Also connected to lines 8, 9 and 10 is a 3-pole, double-throw switch 51, 52, 53. When the switch 51, 52, 53 is in the position to close the contacts $a$ and $b$, the lines 8, 9 and 10 are shorted together by line 54. When the switch 51, 52 53 is in the position to close contacts $a$ and $c$, the lines 8, 9 and 10 are respectively connected to the parts 55, 56 and 57 of a 3-phase choke. The other end of chokes 53 and 56 are connected by lines 58 and 59 respectively to terminal 25 of a D.C. exciter 30, also mounted on the common shaft. The other end of choke 57 is connected to terminal 26 of the exciter 30.

The main, primary armature winding of the 4-pole machine is connected as in the arrangement of FIG. 1, by lines 34 and 35 to terminals 36 and 37 and thence to a 50 c.p.s. A.C. supply on lines 41 and 42. A starting winding 39 is similarly serially connected with switch 38 across lines 34 and 35.

For starting the machine of FIG. 2, the 3-pole switch 11, 12, 13 is open, 3-pole switch 51, 52, 53 is moved to close contacts *a* and *b* to short together terminals 5, 6 and 7 of the secondary windings 1, 2 and 3. Switch 38 is closed to energise the starting winding 39 from the 50 c.p.s. supply on lines 41 and 42.

To synchronise the machine, the 3-pole switch 51, 52, 53 is moved to close contacts *a* and *c* to energise the windings 1, 2 and 3 from the D.C. exciter 30.

After synchronising, the 3-pole switch 11, 12 and 13 is moved to close contacts *a* and *c* and thereby energise the windings 1, 2 and 3 by A.C. of 100 c.p.s. from exciter 20.

It is important, for satisfactory commutation, that the 100 c.p.s. A.C. shall not flow through the D.C. exciter 30. This is prevented by inclusion in circuit of the 3-phase choke 55, 56, 57. It does not matter that some D.C. from the exciter 30 flows through the armature of the A.C. exciter 20.

If a synchronous induction motor of the change-speed type is used, it is necessary to drive the A.C. exciter to provide always a 100 c.p.s. A.C. output. Conveniently, this can be arranged by driving the exciter 20 by a separate small synchronous motor energised from the supply on lines 41 and 42.

What I claim is:
1. A synchronous electric motor having a main winding energised from a single-phase A.C. source and a field system comprising a winding energised from a D.C. source, in which the field system also comprises a three-phase winding energised from a three-phase source of double the frequency of said single-phase source, the said three-phase winding being such as to provide a rotating field of double the frequency of said single-phase source and of opposite magnitude to the field produced by the negative-sequence current of said single-phase supply.
2. A synchronous electric motor as claimed in claim 1, having a salient pole D.C. energised winding, in which said three-phase winding is an auxiliary winding provided in the surface of the said salient poles.
3. A synchronous electric motor as claimed in claim 1, in which said three-phase winding is adapted to serve also as said D.C. energised winding by connection to said D.C. source through a three-phase choke.
4. A synchronous electric motor as claimed in claim 1, having the main winding provided on the motor stator and the field system provided on the motor rotor.
5. A synchronous electric motor as claimed in claim 4, having said three-phase winding, a D.C. exciter winding for said D.C. source and three-phase exciter winding for said three-phase source of double frequency all mounted on the motor rotor shaft.
6. A synchronous electric motor as claimed in claim 1, having switch means for shorting said three-phase winding for starting and for connecting said three-phase winding to the three-phase supply for synchronous running.

No references cited.